(12) United States Patent
Buchsbaum

(10) Patent No.: US 10,393,480 B2
(45) Date of Patent: Aug. 27, 2019

(54) TARGET ACQUISITION IMPROVEMENTS USING PATTERNED DICHROIC COATINGS

(71) Applicant: Meopta U.S.A., Inc., Trinity, FL (US)

(72) Inventor: Philip E. Buchsbaum, Oldsmar, FL (US)

(73) Assignee: Meopta U.S.A., Inc., Trinity, FL (US)

( * ) Notice: Subject to any disclaimer, the term of this patent is extended or adjusted under 35 U.S.C. 154(b) by 0 days.

(21) Appl. No.: 15/966,124

(22) Filed: Apr. 30, 2018

(65) Prior Publication Data

US 2018/0335278 A1     Nov. 22, 2018

Related U.S. Application Data

(60) Provisional application No. 62/506,786, filed on May 16, 2017.

(51) Int. Cl.

| F41G 1/00 | (2006.01) |
|---|---|
| F41G 1/473 | (2006.01) |
| G03H 1/00 | (2006.01) |
| G02B 1/11 | (2015.01) |
| F41G 3/08 | (2006.01) |
| F41G 1/38 | (2006.01) |
| G03H 1/22 | (2006.01) |
| G02B 1/10 | (2015.01) |
| G02B 23/14 | (2006.01) |
| G02B 27/14 | (2006.01) |
| G02B 27/32 | (2006.01) |

(52) U.S. Cl.
CPC ............... *F41G 1/473* (2013.01); *F41G 1/38* (2013.01); *F41G 3/08* (2013.01); *G02B 1/10* (2013.01); *G02B 1/11* (2013.01); *G02B 23/14* (2013.01); *G02B 27/141* (2013.01); *G02B 27/142* (2013.01); *G02B 27/32* (2013.01); *G03H 1/0005* (2013.01); *G03H 1/2249* (2013.01); *G03H 2001/2284* (2013.01)

(58) Field of Classification Search
CPC ... F41G 1/30; F41G 1/345; F41G 1/38; F41G 1/065; F41G 1/14; F41G 1/473
USPC .................. 42/122, 123, 130–133, 144–146
See application file for complete search history.

(56) References Cited

U.S. PATENT DOCUMENTS

| 2,780,130 | A | * | 2/1957 | Mauer | F41G 1/30 356/251 |
|---|---|---|---|---|---|
| 3,320,671 | A | * | 5/1967 | Rickert | G02B 27/30 250/467.1 |
| 3,645,635 | A | * | 2/1972 | Steck | F41G 1/30 356/252 |
| 5,434,704 | A | * | 7/1995 | Connors | G02B 23/12 250/333 |
| 5,634,278 | A | * | 6/1997 | London | F41G 1/467 124/87 |

(Continued)

*Primary Examiner* — Michael D David
(74) *Attorney, Agent, or Firm* — Dennis L. Cook, Esq.

(57) ABSTRACT

A target spotting device incorporating target acquisition improvements using patterned dichroic coatings wherein a color is assigned to an individual Bullet Drop Compensation reticle and/or other reticle elements to improve the observer's rate of target acquisition is disclosed. These dichroic patterns coatings can also be used individually or with etch and fill, chrome, anti-reflective chrome or holographic reticle elements. Patterned dichroics coatings can be incorporated into both 1st or 2nd focal plane reticle locations.

2 Claims, 2 Drawing Sheets

(56) References Cited

U.S. PATENT DOCUMENTS

| | | | | |
|---|---|---|---|---|
| 5,653,034 A * | 8/1997 | Bindon | F41G 1/345 | 33/297 |
| 5,771,623 A * | 6/1998 | Pernstich | F41G 1/38 | 356/3.03 |
| 5,901,452 A * | 5/1999 | Clarkson | F41G 1/345 | 42/131 |
| 5,953,165 A * | 9/1999 | Stolov | G02B 23/14 | 359/834 |
| 6,327,806 B1 * | 12/2001 | Paige | F41G 1/30 | 42/113 |
| 7,516,571 B2 * | 4/2009 | Scrogin | F41G 1/38 | 42/114 |
| 7,574,810 B1 * | 8/2009 | LoRocco | F41G 1/30 | 124/87 |
| 8,474,173 B2 * | 7/2013 | Matthews | F41G 1/30 | 42/113 |
| 9,494,787 B1 | 11/2016 | Bagwell | | |
| 2004/0047586 A1 * | 3/2004 | Schick | F41G 1/30 | 385/147 |
| 2007/0214701 A1 * | 9/2007 | Grauslys | F41G 1/30 | 42/131 |

\* cited by examiner

TARGET ACQUISITION IMPROVEMENTS USING PATTERNED DICHROIC COATINGS

CROSS-REFERENCE TO RELATED APPLICATION

The present application claims the benefit of previously filed Provisional Patent Application, Ser. No. 62/506,786, filed on May 16, 2017.

FIELD OF THE INVENTION

The device of this disclosure belongs to the field of riflescopes and other types of scopes and binoculars. More specifically it is a device for riflescope target acquisition and/or other reticle elements improvements using patterned dichroic coatings.

BACKGROUND OF THE INVENTION

Bullet Drop Compensation (BDC) (sometimes referred to as ballistic elevation) is a feature available on some rifle scopes. The feature compensates for the effect of gravity on the bullet at given distances (referred to as "bullet drop") in flat fire scenarios. The feature must be tuned for the particular ballistic trajectory of a particular combination of gun and cartridge at a predefined muzzle velocity and air density. Telescopic sights designed for military use featuring BDC reticles or elevation turrets with range markings are fairly common. Since the usage of standardized ammunition is an important prerequisite to match the BDC feature to the external ballistic behavior of the employed projectiles, telescopic sights with BDC are generally intended to assist with field shooting at targets at varying medium to longer ranges rather than precise long-range shots. With increasing range inevitable BDC induced errors will occur when the environmental and meteorological circumstances deviate from the predefined circumstances for which the BDC was calibrated. Marksmen can be trained to understand the main forces acting on the projectile and their effect on their particular gun and ammunition and the effects of external factors at longer ranges to counter these errors. Riflescopes that try to accommodate multiple Bullet Drop Compensations (BDCs) are for the most part confusing. Thus, there is a need for a more accurate and less confusing multiple BCDs and/or other reticle elements of a riflescope.

BRIEF SUMMARY OF THE INVENTION

Using patterned dichroic coatings a color is and applied to each individual BDC of a reticle element and/or other reticle elements to improve the observer's rate of target acquisition.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Figure 1:
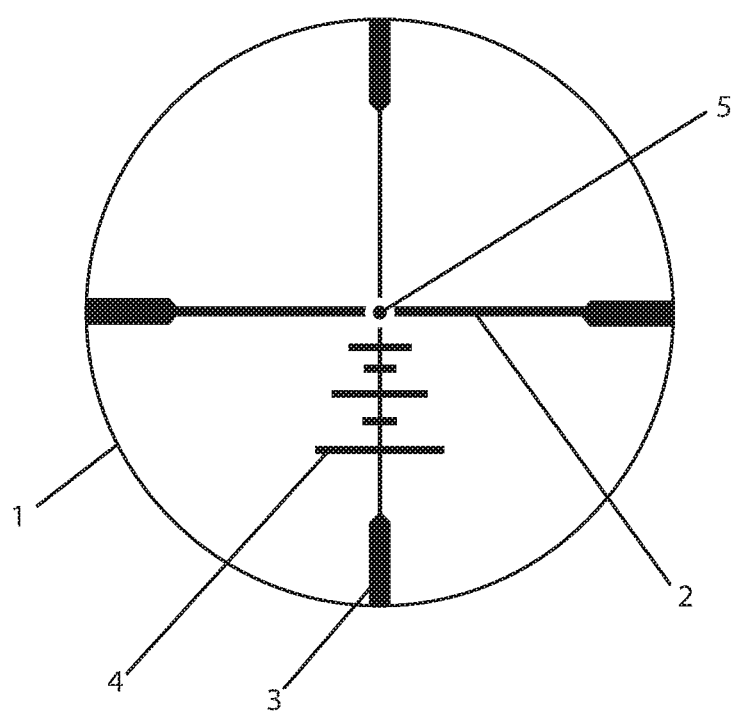
FIG. 1 shows a preferred embodiment Bullet Drop Compensation rifle scope reticle element using patterned dichroic coatings; and, FIG. 2 shows a preferred embodiment wafer having multiple Bullet Drop Compensation rifle scope reticle elements using patterned dichroic coatings.
Figure 2:
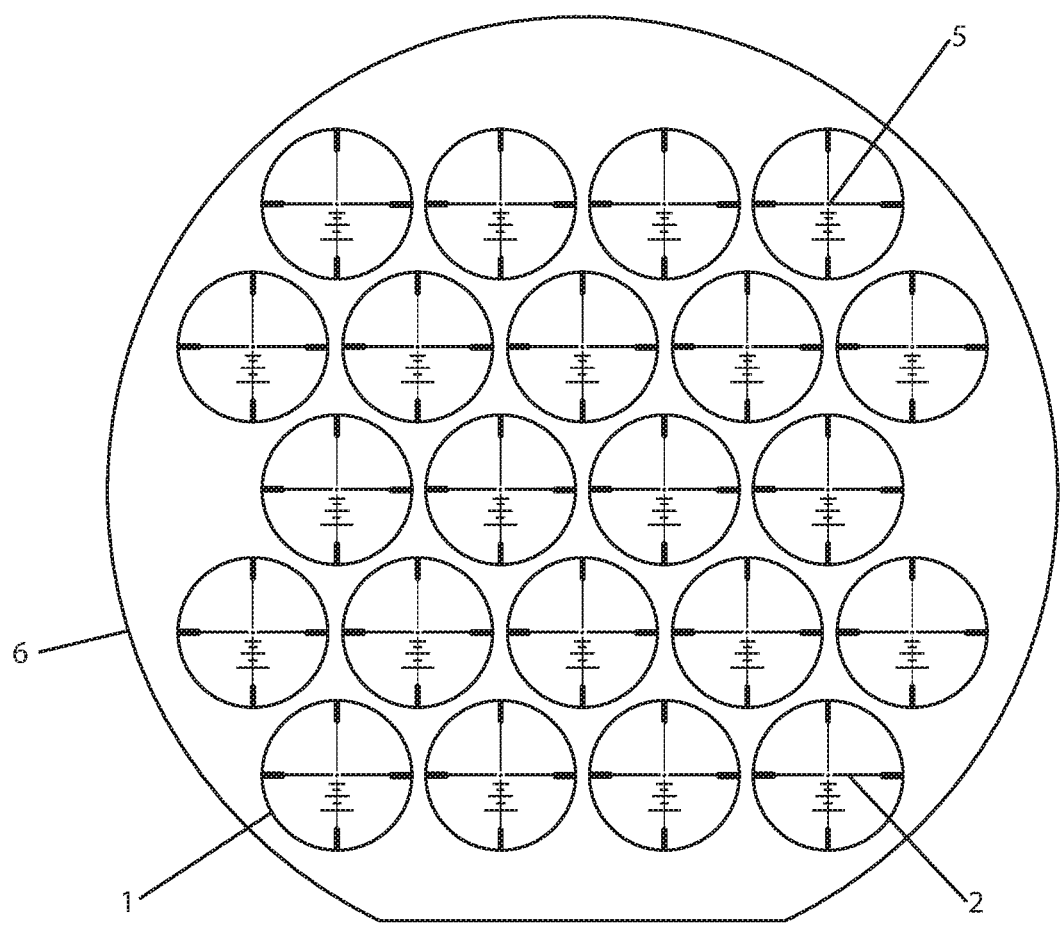

As shown in FIGS. 1 and 2 by using patterned dichroics (2) coated on a wafer (6) a color is applied to each individual BDC (4) of a reticle element (1) to improve the observer's rate of target acquisition in the preferred embodiment. These dichroic patterns coatings (2) can be used individually or with etch and fill, chrome (3), anti-reflective chrome or holographic reticle elements (5). Patterned dichroics coatings (2) can be incorporated into both 1st or 2nd focal plane reticle locations.

Dichroic coatings can also be used to augment the observer's ability to locate targets by offering better contrast to a typical background in riflescopes, spotting scopes and binoculars. In these cases, a patterned dichroic coating (2) can also be used singularly or incorporated with etch and fill, chrome (3), antireflective chrome or holographic reticle elements (5). As with riflescopes discussed above, multiple dichroic patterns (2) can also be used in other target spotting devices.

Since certain changes may be made in the above described reticle element device using patterned dichroic coatings in riflescopes and other spotting devices to improve target acquisition without departing from the scope of the invention herein involved, it is intended that all matter contained in the description thereof or shown in the accompanying figures shall be interpreted as illustrative and not in a limiting sense.

What is claimed is:

1. An improved reticle element for riflescopes and other target spotting devices comprising:
   a reticle element including a patterned dichroic;
   wherein said reticle element is a bullet drop compensation reticle element having two or more individual bullet drop compensation markings;
   wherein the said patterned dichroic is on a wafer and each individual bullet drop compensation marking of said reticle element and/or each reticle element is a different color; and,
   wherein said patterned dichroic includes varying shades and combinations to improve target visibility in variable lighting conditions.

2. The improved reticle element of claim 1 wherein said patterned dichroic is incorporated with etch and fill, chrome, antireflective chrome or holographic reticle elements.

* * * * *